Dec. 15, 1936.  E. VINCKE  2,064,508
PROCESS FOR THE PRODUCTION OF THREADS OF
INDIA RUBBER, GUTTA-PERCHA OR THE LIKE
Original Filed May 19, 1934
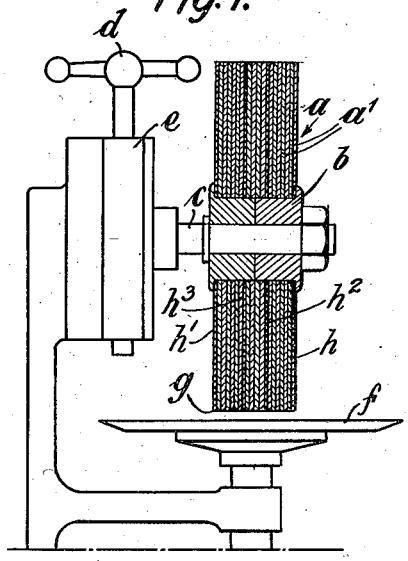
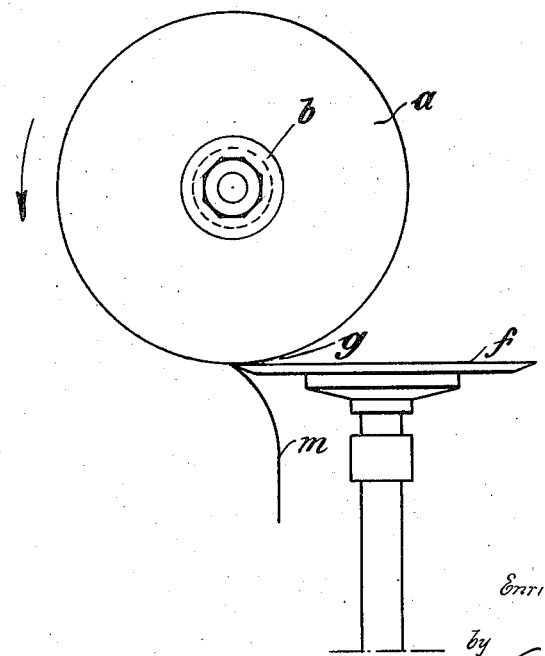
Inventor:
Enrique Vincke
His Attorney Patented Dec. 15, 1936

2,064,508

UNITED STATES PATENT OFFICE 2,064,508

PROCESS FOR THE PRODUCTION OF THREADS OF INDIA-RUBBER, GUTTA PERCHA, OR THE LIKE

Enrique Vincke, Palamos, Spain

Application May 19, 1934, Serial No. 726,592. Renewed September 26, 1935. In Germany May 20, 1933

10 Claims. (Cl. 18—54)

This invention relates to the production of threads in long lengths of india-rubber, gutta-percha or the like.

Of the processes heretofore known that which is most usual comprises severing the threads from slabs or sheets which are as long as the threads. The slabs or sheets are usually prepared directly from india-rubber or gutta-percha by calenders, or from solutions or from latex in a spreading machine, rolled up over their entire breadth on to a drum, mounted in a lathe, and divided into individual threads by cutting the roll radially with circular knives.

It is known that threads prepared from a spreaded slab or sheet far excel those prepared from a calendered slab or sheet. It is also known that it is usual to effect tearing tests in order to distinguish calendered slabs or sheets from spreaded slabs or sheets. In this connection it is found that, while a calendered slab or sheet can be readily torn in longitudinal direction, it presents a greater resistance to tearing in the transverse direction, whereas a spreaded slab or sheet offers the same resistance to tearing in both directions. Also the threads prepared from a spreaded slab or sheet are better and more able to withstand stresses than threads produced from a calendered slab or sheet.

By the invention there may be prepared polygonal threads of india rubber or gutta percha which are equivalent in their properties to threads prepared from a spreaded slab or sheet. Further, the invention renders it possible to produce threads in long lengths—which was not possible with the known processes for the production of threads by cutting up rubber slabs or sheets.

Further it has been proposed to produce threads from a cylindrical india-rubber or gutta-percha block or the like rotatable about its axis with the aid of a knife with continuous relative feed of the block and the knife.

According to the invention the knife performing its cutting movement in a plane parallel to the axis of rotation of a block or the like strips or shaves off at one time a layer extending the entire breadth of the periphery of the block, which layer when engaged by the knife is preferably already divided parallel to its length, that is perpendicular to the axis of rotation of the block, into layers corresponding to the thickness of the threads. The block of india-rubber or gutta-percha serving for the production of the threads is of the form of a disc, that is, has a form whose diameter is great in relation to its thickness. In the production of this block, which may be formed as a solid cylindrical disc or as an annular disc, pressure is applied to the india-rubber or gutta-percha in any direction for example in radial direction or perpendicular thereto or in both directions simultaneously or successively. Alternatively, for the production of the cylindrical block there may be used discous sheets of india-rubber or gutta-percha whose thickness is equal to the thickness of the threads to be produced. These sheets are connected with one another by adhesive or the like which is removed after the layer is stripped off. The invention also comprises a device serving for the performance of the process.

In the accompanying drawing there is illustrated diagrammatically by way of example one form of device serving for the performance of the process.

Fig. 1 shows a part of the device in side elevation.

Fig. 2 shows the device in a side elevation.

Referring to the drawing $a$ denotes a cylindrical india-rubber or gutta-percha block or ring which is mounted on a carrier $b$ and rotates with the spindle $c$. The bearing for the spindle $c$ is accommodated in a block $e$ which is so movable by means of a micrometer screw $d$ in relation to a circular knife $f$ that the line of cut $g$ extends parallel to the spindle $c$.

On rotation of the cylindrical block or ring $a$ in the direction towards the knife $f$ with continuous feed of the spindle carrying the block the knife $f$ strips from the block a layer $m$ which consists of threads the length of which corresponds to the full development of the cylindrical block and the cross-section of which is preferably quadrangular.

There may be used both vulcanized and also unvulcanized blocks or the like. If there are used unvulcanized blocks, it is recommended to have them compacted in known manner.

In more detail calendered or spreaded or otherwise prepared plates or sheets of india-rubber or gutta-percha are used the thickness of which corresponds to the thickness or the breadth of the threads to be produced; or circular discs, preferably annular discs such as $a'$, may be stamped or cut out to the maximum diameter permitted by the size of the sheet. The unvulcanized residues serve for the production of fresh sheets. Thus, there are not used sheets of the entire length of the threads to be cut but relatively short pieces suffice. The stamped or cut out discs are provided on both sides with a binding or adhesive medium and superposed in suitable number, for example 100 to 200 discs, and united to form a cylindrical or annular block. The discs may be vulcanized before causing them to adhere together, or the finished block may be vulcanized, or the threads may first be cut from the unvulcanized block or the like and then vulcanized.

The block, which is somewhat resilient, may be made rigid by affixing on both end faces a disc of stiff paper, pasteboard, wood or the like. Such supporting discs $h$, $h^1$, $h^2$ and $h^3$ may also be arranged at a distance apart within the block between the end discs. In this case the step of causing the india-rubber or gutta-percha discs to adhere together may be dispensed with.

The block or the like so prepared may be fitted to the discribed cutting device. It is then cut up in the described manner by the knife $f$. The layer stripped from the block at this time consists of a set of threads of great length and preferably of quadrangular section located alongside one another and caused to adhere together. When the discs have been caused to adhere together, the threads need only be passed through a bath containing a solvent for the adhesive in order to be freed from adhesive.

In whatever manner prepared the threads may be coloured if required. Thereupon they are dried and made up in bundles, any defective threads being eliminated.

Instead of the rotating knife $f$ there may be used according to the known process for cutting rubber plates a reciprocating longitudinal knife or band knife as provided in devices for cutting long plates from continuous blocks with continuous feeding movement. The use of such knives may, however, be disadvantageous because the cut is irregular in consequence of the vibrations of the knife, so that flutes are produced on the surface of the cut material, which is not permissible in the case of threads. For this reason the use of a rotating knife is preferable. It is also preferable to sharpen the cutting edge of the knife $f$ automatically during the cutting operation. With such circular knives vibration at the periphery of the knife may be so reduced as to ensure that a smooth cut is always maintained.

The advantages of the invention are as follows:

In the first place there are obtained india-rubber and gutta-percha threads of best quality. In the second place there may be produced threads of much greater length than those prepared by the known cutting processes. Further, the speed of production is considerably increased. For example, from an annular block of 1000 millimetres external diameter and 200 millimetres internal diameter with a thickness (circumferential breadth) of 150 millimetres there may be produced simultaneously 150 threads each 700 metres long and one square millimetre in cross section in less than half an hour.

A further advantage consists in economization of material and wages. It is always difficult by the known processes to produce long slabs or sheets which are free from defects. Only specially skilled workers can be employed for this operation. Nevertheless, it is impossible to avoid defects which in certain circumstances may destroy the value of the entire cutting operation. With the process of the invention no long slabs or sheets are necessary, but it suffices to employ short pieces of a breadth equal to the diameter of the disc. These pieces can be readily examined for defects while unvulcanized. Any excess, as it is unvulcanized, can be used for the preparation of another sheet. Also in the course of the operation the production can be so contrived that a minimum number of spoiled threads is produced.

It is particularly important that the process according to the invention permits of the production of quite thin threads, i. e., of a diameter or a thickness of about 0.2 mm; while with the known processes the lower limit was considerably higher.

Instead of india-rubber and gutta-percha there may be used mixtures of these substances or substitutes, for example synthetic rubber or materials similar to rubber produced by the reaction of di-chlorethylene and tri-chlorethylene with sulphides. When in the specification and claims reference is made to india-rubber and gutta-percha it is to be understood that also mixtures of these materials and substitutes are included.

The relative feeding movement of the knife and the block may be effected manually. Preferably it is effected automatically.

The invention also comprises a modification of the process using a circular knife in which the layer stripped off by the circular knife from the india-rubber or gutta-percha block is sub-divided into threads after being stripped off.

I claim:—

1. In a process for the production of polygonal threads of india-rubber, gutta-percha or the like in great length from a cylindrical block of india-rubber, gutta-percha or the like, rotating about its axis by cutting a layer of the breadth of the periphery of the block with the aid of a knife while effecting continuous relative feeding movement between the block and the knife, the steps of producing the cylindrical block from circular disks made from india-rubber, gutta-percha or the like, joining said disks together by an agent such as an adhesive and removing such agent from between the individual strips of the layer stripped off the block by the knife.

2. A process for producing polygonal threads of india-rubber, gutta-percha or the like comprising forming a cylindrical block from circular disks made from india-rubber, gutta-percha or the like, joining said disks together by an agent such as an adhesive, rotating said block about its axis, cutting from the block a layer of the breadth of the periphery of the block and removing said agent from between the individual strips of the layer stripped off the block by the knife.

3. A process for producing polygonal threads of india-rubber, gutta-percha or the like, comprising forming a cylindrical block from circular disks made from india-rubber, gutta-percha or the like, joining said disks together by an agent such as an adhesive, mounting said disks on supporting means for mechanically supporting them, rotating said block about its axis, cutting from the block a layer of the breadth of the periphery of the block and removing said agent from between the individual strips of the layer stripped off the block by the knife.

4. A process for producing polygonal threads of india-rubber, gutta-percha or the like, comprising forming a cylindrical block from circular disks made from india-rubber, gutta-percha or the like, joining said disks together by an agent such as an adhesive, mounting said disks on supporting means for mechanically supporting them, said supporting means being located at the outside of the block and also within the block, rotating said block about its axis, cutting from the block a layer of the breadth of the periphery of the block and removing said agent from between the individual strips of the layer stripped off the block by the knife.

5. The process for the production of polygonal threads of india-rubber, gutta-percha or the like, comprising assembling a plurality of disks of india-rubber, gutta-percha or the like, in face to face engagement, mounting the same for rotary movement while maintaining said disks in substantially non-displaceable relation with one another, and cutting a layer of the breadth of the periphery of the block with the aid of a knife while effecting continuous relative feeding movement between said disks and said knife.

6. The process for the production of polygonal threads of india-rubber, gutta-percha or the like, comprising assembling a plurality of disks of india-rubber, gutta-percha or the like, positioning supporting means between certain of said disks, mounting said disks and supporting means for rotary movement while maintaining said disks in substantially non-displaceable relation with one another, and cutting a layer of the breadth of the periphery of the block so formed with the aid of a knife while effecting continuous feeding movement between said disks and said knife.

7. The process for the production of polygonal threads of india-rubber, gutta-percha or the like, comprising assembling a plurality of disks of india-rubber, gutta-percha or the like, positioning supporting means at the sides of the block so formed, mounting said disks and supporting means for rotary movement while maintaining said disks in substantially non-displaceable relation with one another, and cutting a layer of the breadth of the periphery of the block with the aid of a knife while effecting continuous feeding movement between said disks and said knife.

8. The process for the production of polygonal threads of india-rubber, gutta-percha or the like, comprising assembling a plurality of disks of india-rubber, gutta-percha or the like, positioning supporting means at the sides and intermediate the sides of the block so formed, mounting said disks and supporting means for rotary movement while maintaining said disks in substantially non-displaceable relation with one another, and cutting a layer of the breadth of the periphery of the block with the aid of a knife while effecting continuous feeding movement between said disks and said knife.

9. The process for the production of polygonal threads of india-rubber, gutta-percha or the like, comprising assembling a plurality of disks of india-rubber, gutta-percha or the like, positioning fibrous supporting means at spaced points in the block so formed, mounting said disks and supporting means for rotary movement while maintaining said disks in substantially non-displaceable relation with one another, and cutting a layer of the breadth of the periphery of the block with the aid of a knife while effecting continuous feeding movement between said disks and said knife.

10. The process for the production of polygonal threads of india-rubber, gutta-percha or the like, comprising assembling a plurality of disks of india-rubber, gutta-percha or the like, positioning supporting means at spaced points in the block so formed, joining said disks and said supporting means by an agent such as an adhesive, mounting said disks and supporting means for rotary movement, and cutting a layer of the breadth of the periphery of the block with the aid of a knife while effecting continuous feeding movement between said disks and said knife.

ENRIQUE VINCKE.